United States Patent [19]

Meader, Jr.

[11] 4,036,797

[45] July 19, 1977

[54] POLYURETHANE PRECURSORS CONTAINING THIXOTROPIC AGENTS

[75] Inventor: Arthur L. Meader, Jr., Berkeley, Calif.

[73] Assignee: Chevron Research Company, San Francisco, Calif.

[21] Appl. No.: 396,040

[22] Filed: Sept. 10, 1973

[51] Int. Cl.² .............................................. C08L 95/00
[52] U.S. Cl. .......................... 260/28 R; 260/28.5 AS; 260/33.6 UB
[58] Field of Search ................. 260/32.4, 28.5 AS, 28, 260/33.6 UB, 37 N, 30.4 N, 31.2 N

[56] References Cited

U.S. PATENT DOCUMENTS

| | | | |
|---|---|---|---|
| 2,955,056 | 10/1960 | Knox | 260/77.5 AM |
| 3,243,372 | 3/1966 | Dreher | 252/51.5 |
| 3,284,357 | 11/1966 | Koundakjian | 252/51.5 |
| 3,346,497 | 10/1967 | Dreher | 252/51.5 |
| 3,369,000 | 2/1968 | Blomeyer | 260/28 |
| 3,388,100 | 6/1968 | Thoma | 260/75 NQ |
| 3,401,027 | 9/1968 | Dreher | 44/7 |
| 3,489,723 | 1/1970 | Kraft | 260/37 N |
| 3,615,802 | 10/1971 | Betty | 260/28 |
| 3,637,558 | 1/1972 | Verdol | 260/28.5 AS |
| 3,714,110 | 1/1973 | Verdol | 260/33.6 UB |
| 3,743,617 | 7/1973 | Kest | 260/33.6 UB |

Primary Examiner—Paul R. Michl
Attorney, Agent, or Firm—C. J. Tonkin; J. T. Brooks

[57] ABSTRACT

Polyurethane-forming compositions comprise (a) a polyurethane precursor, (b) a substantially inert, non-volatile extender, (c) a thixotropic agent formed by reacting a long chain primary or secondary monoamine and a polyisocyanate at a NCO/amine ratio of 0.1–1.05:1 and optionally (d) one or more inert fillers.

11 Claims, No Drawings

POLYURETHANE PRECURSORS CONTAINING THIXOTROPIC AGENTS

FIELD OF THE INVENTION

This invention relates to polyurethane forming compositions, particularly those which contain thixotropic agents.

BACKGROUND OF THE INVENTION

Polyurethane compositions are prepared from polyols and polyisocyanates. Depending upon the properties desired for the polyurethane, the polyols will be of varying molecular weight ranging from as little as 62 for ethylene glycol and up to several thousand for the polymeric polyols.

In addition to being quite viscous, the higher molecular weight polyols generally are relatively expensive. Likewise, the polyisocyanates are generally expensive. In order to improve the handling characteristics of the polyols and, more importantly, to reduce the cost of the polyruethane material obtained, the polyols prior to being reacted with the polyisocyanate are generally blended with an inert extender. The extenders are usually substantially non-volatile, medium viscosity oils or cut-back asphalts. Adding these materials to the polyols substantially reduces their viscosity, thereby making them easy to handle.

When these lower viscosity polyurethane forming compositions are applied to surfaces such as floors, they flow rather easily and are self-leveling. This is a highly advantageous property except when the surface to which the polyurethane is applied is not level. For example, running tracks often have banked turns up to 5%, generally 2-3%, slope. When polyurethane compositions are applied to these slopes, they tend to slump and run off. Obviously this is not an acceptable situation. Furthermore, it is often desirable to apply polyurethane compositions to areas having greater slopes than this and even to walls and ceilings. However, it is also desirable to have compositions which are easily handled (e.g., liquids which can be pumped, etc.) thereby allowing easy installation.

DISCUSSION OF THE PRIOR ART

Petty, U.S. Pat. No. 3,615,802 issued Oct. 26, 1971 describes thickened thixotropic bituminous cut-back compositions comprising bituminous material, bituminous solvent, and monomeric di-substituted ureas formed by the in situ reaction of a long chain aliphatic amine and an isocyanate. These compositions are described as adhesives, caulking compositions and coatings.

Dreher et al, U.S. Pat. No. 3,242,210 issued Mar. 22, 1966 describes grease thickening agents having relatively high melting points. These agents are polyurea compounds prepared by mixing diisocyanate and diamines with monoisocyanates or monoamines in certain proportions. Dreher et al, U.S. Pat. No. 3,243,372 issued Mar. 29, 1966; Koundakjian, U.S. Pat. No. 3,284,357 issued Nov. 8, 1966; Dreher et al, U.S. Pat. No. 3,346,497 issued Oct. 10, 1967; Criddle, U.S. Pat. No. 3,376,223 issued Apr. 2, 1968 and Dreher et al, U.S. Pat. No. 3,401,027 issued Sep. 10, 1968, describe various urea derivatives as thickeners for hydrocarbonaceous materials.

Doyle, E. N., *The Development and Use of Polyurethane Products*, McGraw-Hill Book Company (New York), Page 14, lists the relative order of reactivity of isocyanates with water, amines, hydroxyl groups, and carboxyl groups. Amines are said to react slower than water and faster than hydroxyl groups with isocyanates.

Ferstandig, L. L. and Scherrer, Robert A., *Mechanism of Isocyanate Reactions with Ethanol*, 81 JACS 4838 (1959) describes studying the rates of reaction with ethanol of a number of phenyl-substituted isocyanates. In the experimental section, Ferstandig et al, mention it was demonstrated that dibutyl amine reacted with the isocyanate quantitatively in less than one minute. The dibutyl amine was used as a shortstop in the rate of reaction studies.

SUMMARY OF THE INVENTION

We have now discovered polyurethane compositions having thixotropic properties comprising (a) a polyurethane precursor, (b) a substantially inert, non-volatile extender, (c) a thixotropic agent formed by reacting a long chain primary or secondary monoamine and a polyisocyanate at a NCO/NH ratio of 0.1-1.3:1 and optionally (d) one or more inert fillers.

These compositions exhibit thixotropic properties and when mixed with polyisocyanates cure into polyurethanes. The thixotropic agent can be preformed well in advance of curing the polyurethane precursor into a polyurethane. Alternatively, it can be formed at the same time the polyisocyanate for curing the polyurethane precursor into a polyurethane is mixed with the compositions. In the latter case, the thixotropic agent forms almost instantly and if used in the proper proportions, provides compositions which do not run or slump on walls and ceilings and other similar surfaces.

DETAILED DESCRIPTION OF THE INVENTION

Our thixotropic polyurethane-forming compositions comprise:

A. 10 to 80, preferably 18 to 50 weight percent of a polyurethane precursor, said polyurethane precursor comprising
  1. a high molecular weight polyol, and
  2. a low molecular weight chain stiffener,
  3. wherein the mole ratio of the isocyanate reactive groups of said low molecular weight chain stiffener to the isocyanate reactive groups of said high molecular weight polyol is 0.5-4.0:1, preferably 1-3:1.

B. 90 to 20, preferably 80 to 30 weight percent of a substantially inert, non-volatile extender, C. 0.5 to 8, preferably 1 to 5 weight percent of a thixotropic agent formed by reacting a long chain primary or secondary monoamine and a polyisocyanate at a NCO/amine ratio of 0.10-5:1, and D. 0 to 20 weight percent of an inert filler.

POLYURETHANE PRECURSORS

The polyurethane precursor of the composition is a mixture of a high molecular weight polyol and a low molecular weight chain stiffener. The low molecular weight moiety provides increased tensile strength, tear strength and modulus to the polyurethanes prepared from these compositions.

HIGH MOLECULAR WEIGHT POLYOL

The high molecular weight polyols are primarily diols, although there may be minor amounts of higher order polyols present. The high molecular weight polyols will generally have a molecular weight of at least 1500 and generally will not exceed a molecular weight of about 5000. Preferably they have a molecular weight ranging from about 2000–4000 and, most preferably, from about 2200–3000. At least two of the hydroxyl groups will usually be at, or near (within about 4 carbon atoms of) the terminal carbon atoms, and will be separated by chains of at least 40 carbon atoms. Preferably the diols are primary alcohols.

Suitable polyols include polyalkylene polyols. The hydrocarbon chain can be readily prepared by polymerizing anionic-addition polymerizable olefins using a metallo-organic catalyst. See, for example, Hayashi et al, *Journal of Polymer Science, Part A II,* 2571–2594 (64) and U.S. Pat. No. 3,055,952. The hydroxyl groups may be introduced at the terminal ends of the polymer by oxidation, or addition of aldehydes, ketones or oxides. Free radical polymerization using hydrogen peroxide in an alcohol may also be used.

Polyols can be derived from monomers such as butadiene, styrene, isoprene, propylene, alpha-methylstyrene or alpha-t-butylstyrene, 2-ethylenebutadiene, etc. Normally the olefins will contain from about 4–10 carbon atoms. Of the polyols prepared from olefins, the preferred polymer is polybutadiene.

Other suitable polyols include polyalkylene ether polyols prepared, for example, by alkylene oxide addition to water, alkylene glycols and/or dialkyleneglycols. These include polyethylene ether glycols, polypropylene ether glycols, mixed poly (ethylene and propylene) ether glycols, and mixtures thereof. Other suitable polyols can be prepared by reacting ethylene oxide, propylene oxide or mixtures thereof with mono- and polynuclear dihydroxybenzenes, e.g. catechol, resorcinol, hydroquinone, orcinol, 2,2-bis-(p-hydroxyphenyl) propane, etc., or with aliphatic polyols such as glycerol, sorbitol, trimethylol propane, 1,2,6-hexane triol, pentaerythritol, sucrose or glycosides, and the like. Many other suitable polyetherpolyols are well known. See, for example, McClellan, U.S. Pat. No. 3,450,653, particularly at Col. 3, lines 9–42.

LOW MOLECULAR WEIGHT CHAIN STIFFENER

The low molecular weight chain stiffeners are incorporated in the polyurethane to enhance the physical properties. These chain stiffeners include polyols, polyamines and hydroxyamines. They are generally difunctional but can contain small amounts, generally less than 25 equivalent percent and more usually not more than 5–10 equivalent percent, of tri- and higher-order-functionality molecules. They will generally have from about 2–12 atoms separating the most distant hydroxyl and/or amine groups, will normally contain from about 2, preferably 4 to about 18 carbon atoms and have molecular weights ranging from about 62 to about 300. The atoms intermediate of the hydroxyl groups and/or amine groups, besides, may be oxygen, nitrogen or sulfur. Generally they will contain from 0-2 heteroatoms.

Examples of suitable chain stiffeners include 3-dimethylamino-1, 2-propanediol, 1,4-di-(hydroxymethyl)cyclohexane, 1,4-butanediol, 4,4'methylenedianiline, diethanolamine, tolidine, 3-methyl-1,5-pentanediol, trimethylolopropane, glycerine, ethyleneglycol, triethanolamine, di-ethyleneglycol, N,N,N,'N,'-tetrakis(2-hydroxypropyl)ethylenediamine and N,N-bis-2-hydroxypropyl)aniline of which the last is preferred for many surfacing applications. The mole ratio of the isocyanate reactive groups of the low molecular weight chain stiffener to the isocyanate reactive groups of the high molecular weight polycol will range from about 0.5–4:1, and preferably be about 1–3:1.

The amino groups of the low molecular weight chain stiffener are highly reactive toward the polyisocyanate used to prepare the thixotropic agent. Therefore, the low molecular weight chain stiffener should be selected to contain mostly hydroxyl groups unless the polyisocyanate for preparing the thixotropic agent is to be added at the same time as the polyisocyanate for curing the polyurethane precursors. This procedure is discussed below.

EXTENDER

A variety of extenders are suitable for use in the compositions of the invention. These materials are generally liquids or semi-liquids having their glass transition temperatures ($T_G$) below 0° C.

A principal requirement of the extenders is that they are compatible with the polyurethane precursors and the polyurethanes prepared therefrom. A preferred characteristic of the extenders is that they be less expensive than the polyurethane prepared from these compositions since the extenders are used to increase the volume of the compositions with minimum cost and without introducing foaming into the structure. The extenders also should not detract from the desirable physical properties of the polyurethane compositions ultimately prepared from these compositions.

Suitable extenders include, for example, cut-back asphalts which are mixtures of asphalt and a volatile solvent. Suitable asphalts include those having penetrations of from about 40 to about 200, preferably 50 to about 150. A particularly useful asphalt for this invention is one having a penetration of 85/100 at 77° F. The solvents used in preparing cut-back asphalts are generally volatile; that is, they usually have boiling points such that they evaporate from the asphalt within a short period after the asphalt cut-back is spread out to form a surface. Excellent, inexpensive cut-back solvents are available as certain fractions from petroleum refining. A preferred cut-back asphalt consists of 80 volumes of 85/100 penetration asphalt and 20 volumes of a largely aliphatic low boiling petroleum hydrocarbon having a mid-point of its boiling range at 265° F.

Instead of, or in addition to, the cut-back asphalt, an extender oil can be used. A wide variety of extender oils are suitable for this purpose. The oil should not bleed, exude, or evaporate significantly from the polyurethane ultimately prepared from the compositions. It also must be compatible with the polyol and other materials of the composition. Oils having a substantial amount of aromatic component are more miscible with the polyol component. Oils having an aniline point of from about 75 to about 140° F are preferred. A particularly useful extender oil is the extract from a side cut in the manufacture of lube oils wherein phenol is used to extract aromatics. The resulting extract has a viscosity of about 2100 SUS at 100° F and an aniline point of 100° F. Other oils suitable for use as extenders in the compositions of the invention include the so-called "rubber processing oils" used as extenders for certain rubber products in the rubber industry. An example of such oils is Dutrex 315 available from Shell Oil Co.

THIXOTROPIC AGENT

The compositions of the invention include a thixotropic agent. By including this agent, the compositions demonstrate increasing viscosity with decreasing shear. For example, the compositions of this invention can have viscosity increases of greater than a factor of 7 when the shear rate is reduced by a factor of 100. The thixotropic compositions of this invention can be applied to vertical or inclined surfaces or ceilings before the polyurethane has cured. The low viscosity at a high shear rate allows the composition to be easily applied. The high viscosity at a low shear rate causes the composition to remain in place without run-off, even on vertical walls and ceilings, until the polyurethane cures.

The thixotropic agents of the compositions are prepared from low molecular weight long chain primary and secondary monoamines and polyisocyanates. Suitable amines include those which contain between about 6 and about 30, preferably between about 12 and about 22 carbon atoms, containing at least one primary or secondary, preferably primary, amine group. The amines used can be either single compounds or mixtures of amines. Often crude mixtures of naturally occurring amines or amines prepared from naturally occurring products are quite suitable. The monoamines can include small amounts, generally not more than 25 molar percent diamines. The diamines provide increased thixotropy with very little increase in the quantity of the amines required.

Suitable amines include tall oil fatty amines (mixed amines obtained from naturally occurring materials), oleylamine, dodecylaniline, methyl imino bis(propylamine), and ethylene diamine.

Suitable polyisocyanates are discussed below under that heading. The polyisocyanates used to prepare the thixotropic agents usually have an average functionality number of at least 2. The NCO/NH ratio usually ranges from about 0.10–1.3:1 and preferably from about 0.50–1.1:1.

The thixotropic agents can be prepared in a variety of ways. They are most readily prepared in situ. The composition containing the polyurethane precursor, the extender, the long chain monoamines, and any inert fillers are prepared as described below under the heading PREMIX. The requisite amount of polyisocyante is then added to form the thixotropic agent.

There are several ways to add the polyisocyanate to the premix. If the composition is not to be used immediately, the polyisocyanate is added to the premix slowly with agitation, preferably vigorous agitation. If the polyisocyanate is added too rapidly, the composition may become lumpy. The efficiency of the thixotropic agent depends to some extent upon the mixing given to the composition during the isocyanate addition. If only mild agitation is used, some lumps can form and less thixotropy is obtained. If a gear pump with recycling is used, better mixing is obtained and greater thixotropy is obtained per unit amount of thixotropic agent formed.

Another method which is quite useful is to add enough isocyanate to the premix composition to form both the thixotropic agent and cure the polyurethane precursor into the polyurethane. If the premix composition contains large amounts of the monoamine, it will become thixotropic very rapidly upon addition of the isocyanate. Preferably, blending is done with a two-component metering and mixing spray system. This system mixes the premix and the polyisocyanate together just before they are ejected from the nozzle of the spray gun. If the premix contains sufficient monoamine and sufficient catalyst (the amine also acts as a catalyst), enough thixotropic agent will be formed by the time the composition strikes onto which it is being sprayed to prevent run-off or slump prior to curing of the polyurethane. This method is particularly advantageous since it allows storage and handling of non-thixotropic materials but provides thixotropic materials as needed.

A particularly useful method is to form only part of the thixotropic agent initially and the remainder at the time of final use, especially when the premix contains fillers. The fillers have a tendency to settle out of the premix during storage. If part of the thixotropic agent is formed immediately after premix preparation, this settling out can be greatly reduced, if not eliminated. On the other hand, if only the minimum amount of thixotropic agent needed to prevent settling is formed, the composition will not be so viscous that blending in the remaining amount of polyisocyanate will be difficult.

One of the particular advantages of this invention is the degree of control over thixotropy which is allowed. As little or as much viscosity as is needed can be introduced by the formation of the proper amount of thixotropic agent. Furthermore, this is accomplished without consuming the expensive polyurethane precursors. It also can be accomplished in a very short time period, e.g., as little as a small fraction of a second.

Depending upon the quantity of monoamine present in the premix, the composition, once the thixotropic agent is formed, will have varying consistencies. The thixotropic composition can have an at-rest consistency ranging from, for example, a viscous oil to a semisolid putty-like material. Intermediate consistencies resembling light greases are easily obtained and are quite useful in applications where an extended urethane is desired but dams, forms and the like are inconvenient or impossible to use.

POLYISOCYANATE

The polyisocyanates are used not only to prepare the thixotropic compositions of this invention but are also used to cure these compositions into a polyurethane.

The polyisocyanates will generally be diisocyanates or mixtures of diisocyanates with higher orders of polyisocyanates, normally not exceeding 5 isocyanate groups per molecule. Usually in mixtures of di- and higher order polyisocyanates, the higher order polyisocyanates will be present in not more than 50 equivalent percent, usually not more than 20 equivalent percent of the isocyanate mixture. Preferably, diisocyanates are used. The higher order polyisocyanates (greater than di-) have at least 12 carbon atoms and usually do not exceed 46 carbon atoms. The diisocyanates generally vary from about 6 to 24 carbon atoms.

Illustrative polyisocyanates include diphenyldiisocyanate, bis-(isocyanatophenyl)methane (available commercially as Isonate 143L from Upjohn Company), 1,4-naphthalene diisocyanate, polyphenyl polymethylene isocyanate, (PAPI supplied by Upjohn Company), toluene diisocyanate (TDI), hexamethylene diisocyanate, dodecamethylene diisocyanate, 1,4-diisocyanatocyclohexane, mixed polyphenyl polymethylene isocyanate and bis-(isocyanatophenyl)methane (available as Thanate P-220 from Jefferson Chemical Co.), etc.

The mole ratio of isocyanate groups to amine groups to prepare the thixotropic agent is discussed above. To prepare polyurethanes from the compositions of our invention, the mole ratio of isocyanate groups to isocyanate reactive groups of the polyurethane precursor (hereinafter referred to as the NCO/OH ratio) can range from as little as 0.50 or less up to 2.3 or more. The particular mole ratio chosen is dictated by the intended use of the polyurethane. For example, in pipe joint sealants, a low mole ratio contributes to tackiness. For recreational surfaces, a high mole ratio (1.3 or greater) contributes to tensile strength and tear strength.

FILLERS

The compositions of the invention can include one or more inert fillers. These fillers are generally finely divided solids. They are included to improve the properties of the composition or to improve the properties of the polyurethane prepared therefrom. For example, clays can be included to improve the tear strength of the polyurethane. In addition they, like the extenders, increase the volume of the composition at minimum cost and thereby increase the coverage obtained from the most expensive component: the polyurethane.

Calcium oxide can be included as a desiccant to absorb any free water in the other materials in the composition. This is highly advantageous since the polyisocyanate will react with any water present in the materials to evolve carbon dioxide. Aside from the loss of expensive polyisocyanate to this side reaction, the carbon dioxide can cause foaming and bubbling of the composition which can be highly undesirable in certain applications. In addition to calcium oxide, other excellent drying agents include calcium chloride, potassium carbonate, magnesium sulfate, calcium sulfate, synthetic zeolites (molecular sieves), etc.

Other useful fillers include alumina, calcium carbonate, magnesium carbonate, whiting, silica, carbon black, etc. Carbon black, for example, provides a certain amount of thickening to the composition, in addition to that provided by the thixotropic agent, prior to complete curing of the polyurethane. Carbon black also provides ultraviolet resistance and tear strength to the polyurethanes prepared from the composition.

All the inert fillers should be finely divided such that they are easily blended with the other materials of the composition and do not make it lumpy. For example, carbon black having a mean particle diameter of about 10 to about 70 millimicrons is quite suitable. Particularly preferred are carbon blacks having a mean particle diameter of from about 20 to about 55 millimicrons. The dimensions of the other inert fillers are not necessarily limited to these ranges but, in general, the average particle diameter should be less than 800 millimicrons and usually less than 200 millimicrons.

RESILIENT FILLER

The compositions of the invention can include a resilient filler. Like the fillers discussed above, these materials are solids, but as their name implies they are resilient: i.e. they have the capacity to recover their size and shape after deformation, especially from compressive forces. Such materials can be included to impart a variety of properties to the polyurethane obtained from the composition. In addition, the resilient filler can also reduce the cost by reducing the quantity of the more expensive materials, particularly the polyurethane needed. In general, all resilient fillers which are compatible with the other materials of our compositions are suitable for use in our compositions. These can include materials such as scrap rubber, pulverized polyurethane, such as the polyurethanes, particularly the extended polyurethanes similar to those prepared from our composition, and other such similar materials.

The size of the resilient filler used will vary with the intended end use of the composition. The resilient filler can range from large chunks which pass a one inch screen, or larger, down to very finely divided materials passing a No. 30 U.S. Standard sieve or smaller. For certain applications such as running tracks and playground covering materials, the resilient fillers should be relatively coarse, substantially all passing through a quarter inch U.S. Standard sieve and preferably not more than 10% passing through a No. 30 U.S. Standard sieve. For other applications such as in pipe joint sealants and the like, substantially all the resilient fillers should pass through a quarter inch U.S. Standard sieve and preferably at least 90% pass through a No. 30 U.S. Standard sieve, with less than 10% passing through a No. 140 U.S. Standard sieve.

The particle size of the resilient filler as well as the use of the composition will govern the quantity of filler which can be used in the composition. The more finely divided the resilient filler, the larger the surface area per unit of weight. Accordingly, in order to get a good coherent mass, the quantity of resilient filler which can be used in our compositions will decrease with decreasing particle size. The exact upper limit for any particular particle size can be readily determined by simply mixing test samples containing various quantities of resilient aggregate and measuring the physical properties of the resultant compositions. Typically, the resilient filler will comprise 10–75% w of the polyurethane composition prepared from the thixotropic compositions of this invention.

CATALYST

Catalysts can be included in our composition to increase the rate of curing of the polyurethane precursors into polyurethanes. The quantity used depends on the rate of curing desired and the NCO/OH ratio. Generally, the lower the ratio, the more catalyst needed to cause a rapid cure. The particular usage level is easily determined by simple experimentation, taking into account certain guidelines. For example, amines are known to be polyurethane reaction catalysts. Accordingly, when the isocyanate to cure the polyurethane precursors is added at the same time as the isocyanate to form the thixotropic agent, the quantity of supplemental polyisocyanate reaction catalyst necessary will be reduced. Also certain of the low molecule weight chain stiffeners such as the N,N-bis-(2-hydroxypropyl)aniline contain tertiary amine groups which act as polyurethane reaction catalysts.

Generally, the catalyst usage level will range from about 0 to about 15, preferably from about 0.005 to 3.0 weight percent of the combined weight of the polyurethane precursor and polyisocyanate. Suitable catalysts include dibutyl tin dilaurate, diazabicycloctane, stannous octoate, tertiary amines, including mixtures thereof, particularly those of moderate to low volatility (e.g., boiling points from 100°–150° C), etc. Of these dibutyl tin dilaruate and mixtures of this catalyst with tertiary amines are preferred.

PREPARATION OF THE COMPOSITIONS

The compositions of this invention are prepared by blending together the various components and allowing the polyisocyanate and the long chain monoamines to cure into the thixotropic agent. While such blending could be undertaken each time some of this composition is needed, it is more convenient to prepare a premix which contains all of the components except for the polyisocyanate and the resilient filler. At the time the composition is to be prepared, the premix is then blended with the polyisocyanate. If a resilient filler is to be used, it is sometimes more convenient to add it to the premix prior to adding the polyisocyanate, particularly if the composition will contain a large amount of thixotropic agent. The composition then can be blended with sufficient polyisocyanate to cure the polyurethane precursor if that amount of isocyanate was not added during the initial polyisocyanate addition. The composition then cures to provide an excellent extended polyurethane.

PREMIX PREPARATION

As mentioned above, the premix generally comprises all the components except the resilient filler and the polyisocyanate. Generally, it is most convenient to disperse the fillers such as carbon black, clay, etc., and the catalyst (if any) in the extender. Thereafter, the high molecular weight polyol, the low molecular weight chain stiffener, the long chain monoamines, and any other liquid additives are blended in.

The thixotropic agent can then be partially or completely formed. One advantage of converting at least part of the long chain monoamines into the thixotropic agent during premix preparation is that it prevents settling out of the fillers. The degree to which the long chain monoamines are converted into the thixotropic agent is governed by the need to control settling out problems and the subsequent operations to be performed on the premix. For example, if the composition is to be sprayed, very little, if any, of the thixotropic agent should be formed prior to the spraying operation. On the other hand, if the composition is to be applied with a trowel or spatula, a higher degree of thixotropy may be desired. While a large amount of thixotropy may be desirable, the more viscous the composition is made, the more difficult it will be to blend in the resilient filler (if any) and polyisocyanate when it is desired to cure the composition into a polyurethane.

The polyisocyanate can be blended into the premix and into the composition of the invention by any convenient means. When a mixing method is chosen which uses pumps, recirculating lines, and the like, care must be taken to not plug them with cured composition.

The following examples are included to further illustrate the invention. In these examples, all parts are by weight unless otherwise indicated.

EXAMPLE I

Thixotropic polyurethane-forming compositions are prepared as follows. A first premix composition is prepared by combining the components listed in Table IA below. The dibutyl tin dilaurate is blended with the extender oil until a uniform dispersion is obtained. The remainder of the components are then blended in.

TABLE IA
FIRST PREMIX COMPOSITION

| Component | Parts |
|---|---|
| Extender - cut-back asphalt consisting of 80 volumes of 85/100 penetration asphalt and 20 volumes of a largely aliphatic low-boiling petroleum hydrocarbon having the midpoint of its boiling range at 265° F. | 56.5 |
| Polybutadiene diol (average molecular weight 2,500-2,800) | 37.19 |

TABLE IA-continued
FIRST PREMIX COMPOSITION

| Component | Parts |
|---|---|
| N,N-bis(2-hydroxypropyl)aniline (Isonol C-100) | 6.3 |
| Dibutyl tin dilaurate | 0.01 |

From the above first premix, a pre-thixotropic premix is prepared by combining 96.84 parts of the premix, 1 part of toluene, 1.5 parts additional extender, 0.33 parts of tall oil fatty amine and 0.33 parts of dodecyl aniline.

Two different thixotropic polyurethane-forming compositions are prepared from the above pre-thixotropic premix. Composition A is prepared by adding slowly, with vigorous agitation, 0.33 parts of Isonate 143L (available from Upjohn Company) to 100 parts of the pre-thixotropic premix. Composition B is prepared using 0.165 parts of Isonate 143L per 100 parts of premix.

For comparison, a third sample (Composition C) is prepared using carbon black as the sole thixotropic agent by combining 96 parts of the first premix with 4 parts of carbon black (means particle diameter 29 millimicrons) in a gear pump to obtain a good dispersion.

The viscosity of each composition is measured on a Brookfield VIscometer Model RVT using spindle No. 6 (except for Composition C at 50 and 700 rpm, use spindle No. 7) at various speeds. All measurements were made at 75° F ± 2° F. The results are shown in Table IA.

TABLE IA
VISCOSITY VERSUS SHEAR RATE

| Spindle | Composition A | Composition B | Composition C |
|---|---|---|---|
| RPM | Vis.(CPS) | Vis.(CPS) | Vis.(CPS) |
| 0.5 | 94,000 | 70,000 | 44,000 |
| 1 | 61,000 | 43,000 | 38,000 |
| 2.5 | 36,000 | 30,400 | 31,200 |
| 5 | 27,000 | 25,200 | 27,600 |
| 10 | 20,200 | 19,500 | 25,400 |
| 20 | 15,650 | 14,450 | 23,400 |
| 50 | 12,720 | 11,460 | 20,720 |
| 100 | off scale | off scale | 19,000 |

The viscosity of Composition A is remeasured after standing 15 hours at room temperature. A viscosity increase of 11.5–13.1 percent (depending on spindle rpm) is found.

The above data demonstrate that the rate of decrease in viscosity with increasing shear (higher spindle rmp) is much greater with the thixotropic compositions of this invention than with compositions which use a conventional thixotropic agent such as carbon black.

EXAMPLE II

A pre-thixotropic polyurethane forming composition suitable for spray application to walls and ceilings is prepared by combining 96.6 parts of the first premix of Example I with 1.7 parts of tall oil fatty amine and 1.7 parts of dodecyl aniline. This composition is combined with a polyisocyanate (Isonate 143L) in a two component metering, mixing and spraying apparatus at a ratio of 100 parts of the pre-thixotropic polyurethane forming composition per 15.4 parts of the polyisocyanate. The reaction to form the thixotropic agent is so rapid that it is essentially complete by the time the composition strikes the ceiling onto which it is being sprayed. Furthermore, the viscosity of the sprayed thixotropic composition at rest on the ceiling is high enough that no slump or dripping is observed. Also, because the composition is thixotropic, the viscosity under the high shear conditions in the spray equipment is sufficiently low that it is easily pumped and sprayed. The composition cures into an extended urethane which provides excellent sound deadening (i.e. reductions of 3-10 decibels in the noise level).

The above thixotropic composition containing approximately 5% w thixotropic agent is suitable for application on ceilings and vertical walls. For floors, ramps, etc., with slopes of 0-30%, compositions containing between 0.1 and 3% thixotropic agent, depending on the slope, are suitable.

I claim:

1. A composition comprising:
   A. 18 to 50 weight percent of a polyurethane precursor, said precursor comprising:
      1. a polyol having a molecular weight of 1500 to 5000, and
      2. a chain stiffener having a molecular weight of 62 to 300, wherein the mole ratio of the isocyanate-reactive groups of said low molecular weight chain stiffener to the isocyanate-reactive groups of said polyol is 0.5-4:1,
   B. 80 to 30 weight percent of a substantially inert, non-volatile extender, selected from the group consisting of cutback asphalts, mineral oils, and mixtures thereof,
   C. 0.1 to 8 weight percent of a thixotropic agent formed in situ by reacting a mixture of primary mono and diamines wherein the monoamine is a monofunctional monoamine containing 6 to 30 carbon atoms and the diamines are selected from the group consisting of a methyl imine bis(propylamine), ethylene diamine and mixtures thereof, wherein the mol ratio of monoamines to diamines is 20-1:1 diamines, and a polyisocyanate at an NCO/NH ratio of 0.10-1.3:1, and
   D. 0 to 20 weight percent of an inert filler.

2. The composition of claim 1 wherein said mole ratio of said monoamines to said diamines is 10-5:1.

3. The composition of claim 2 containing 1 mole of isocyanate groups from said polyisocyanate per mole of isocyanate reactive amine groups and 0.5 to 2.3 moles of isocyanate groups from a polyisocyanate per mole of isocyanate reactive groups of said polyurethane precursor.

4. The composition of claim 1 wherein said monoamine is selected from tall oil fatty amine and dodecylaniline and said diamine is methyl imino bis(propylamine).

5. The composition of claim 1 wherein said monoamine is selected from tall oil fatty amine and dodecylaniline and wherein said diamine is ethylene diamine.

6. A composition comprising:
   A. 18 to 50 weight percent of a polyurethane precursor, said precursor comprising:
      1. a high molecular weight polyol, and
      2. a low molecular weight chain stiffener,
      3. wherein the mole ratio of the isocyanate reactive groups of said low molecular weight chain stiffener to the isocyanate reactive groups of said high molecular weight polyol is 0.5-4:1,
   B. 80 to 30 weight percent of a substantially inert, non-volatile extender, selected from the group consisting of cutback asphalts, mineral oils, and mixtures thereof,
   C. 0.1 to 8 weight percent of a thixotropic agent formed in situ by reacting a mixture of (1) primary or secondary monofunctional monoamines containing 6 to 30 carbon atoms and (2) diamines selected from the group consisting of methyl imino bis(propylamine), ethylene diamine and mixtures thereof, and a polyisocyanate at a NCO/NH ratio of 0.10-1.3:1 and a monoamine to diamine mole ratio of 20-1:1, and
   D. 0 to 20 weight percent of an inert filler.

7. The composition of claim 6 wherein said high molecular weight polyol has a molecular weight of 1500-5000.

8. The composition of claim 7 wherein said low molecular weight chain stiffener has a molecular weight of 62-300.

9. The composition of claim 8 wherein said long chain primary or secondary monoamine contains from 12-30 carbon atoms.

10. The composition of claim 9 wherein said high molecular weight polyol is selected from polybutadiene diols, polyisoprene diols, polybutadiene-styrene diols, polybutadieneacrylonitrile diols, polypropylene glycols, and mixtures thereof.

11. The composition of claim 10 wherein said long chain monoamine is a primary monoamine.

* * * * *